(12) United States Patent
Wang et al.

(10) Patent No.: US 12,371,328 B1
(45) Date of Patent: Jul. 29, 2025

(54) METHOD FOR PREPARING PHOSPHORUS-DOPED GRAPHENE USING PHOSPHORUS-CONTAINING SLUDGE AND BIOMASS

(71) Applicant: Shanxi University, Taiyuan (CN)

(72) Inventors: Baofeng Wang, Taiyuan (CN); Yunxiao Chen, Taiyuan (CN); Fangqin Cheng, Taiyuan (CN); Huirong Zhang, Taiyuan (CN); Jinglei Cui, Taiyuan (CN); Yanxia Guo, Taiyuan (CN)

(73) Assignee: Shanxi University, Taiyuan (CN)

( * ) Notice: Subject to any disclaimer, the term of this patent is extended or adjusted under 35 U.S.C. 154(b) by 0 days.

(21) Appl. No.: 19/037,093

(22) Filed: Jan. 25, 2025

(30) Foreign Application Priority Data

May 7, 2024 (CN) .......................... 202410555517.0

(51) Int. Cl.
*C01B 32/184* (2017.01)
(52) U.S. Cl.
CPC ................... *C01B 32/184* (2017.08)
(58) Field of Classification Search
CPC ............................ C01B 32/182; C01B 32/184
See application file for complete search history.

(56) References Cited

FOREIGN PATENT DOCUMENTS

| CN | 112010302 A | 12/2020 | |
|----|-------------|---------|---|
| CN | 116425149 A | 7/2023 | |
| ES | 2678079 | * 8/2018 | ........... C01B 32/184 |

OTHER PUBLICATIONS

CNIPA, Notification of First Office Action for CN202410555517.0, Oct. 16, 2024.
Shanxi University (Applicant), Replacement claims (allowed) of CN202410555517.0, Nov. 11, 2024.
CNIPA, Notification to grant patent right for invention in CN202410555517.0, Nov. 21, 2024.

\* cited by examiner

*Primary Examiner* — Anthony J Zimmer
*Assistant Examiner* — Eric Scott Sherman
(74) *Attorney, Agent, or Firm* — Hemisphere Law, PLLC; Zhigang Ma

(57) ABSTRACT

A method for preparing phosphorus-doped graphene using phosphorus-containing sludge and biomass, belonging to the field of solid waste resource utilization and environmental protection technologies, includes: performing a hydrothermal reaction with the phosphorus-containing sludge and the biomass to obtain a product, washing and drying the product to obtain phosphorus-doped hydrochar, and subjecting the phosphorus-doped hydrochar to a flash Joule heating treatment to obtain the phosphorus-doped graphene. The method for preparing the phosphorus-doped graphene by flash Joule heating is based on cheap and easily available phosphorus containing sludge and corn cobs as precursors. The high-quality phosphorus-doped graphene can be obtained by the flash Joule heating after in-situ phosphorus doping by a hydrothermal carbonization method. The method for preparing the phosphorus-doped graphene is controllable, fast, simple and efficient, which is beneficial to large-scale production and application.

3 Claims, 3 Drawing Sheets

METHOD FOR PREPARING PHOSPHORUS-DOPED GRAPHENE USING PHOSPHORUS-CONTAINING SLUDGE AND BIOMASS

CROSS-REFERENCE TO RELATED APPLICATION

This application claims priority to Chinese Patent Application No. 202410555517.0, filed May 7, 2024, which is herein incorporated by reference in its entirety.

TECHNICAL FIELD

The disclosure relates to the field of solid waste resource utilization and environmental protection technologies, and more particularly to a method for preparing phosphorus-doped graphene using phosphorus-containing sludge and biomass.

BACKGROUND

Hydrothermal carbonization is an exothermic thermochemical process and a promising thermochemical technology, considered to be a thermochemical technology of potential use for a treatment of high-moisture organic waste. Compared to traditional hydrothermal carbonization, co-hydrothermal carbonization can not only treat multiple types of waste simultaneously, but also, due to interactions between different components, the generated synergistic effects can influence physicochemical properties of hydrochar (also referred to as hydrothermal carbon) and migration and transformation of nutrient elements. Phosphorus is an important strategic resource, and the recovery and utilization of phosphorus resources is urgent. An atomic radius of the phosphorus is relatively large. Introducing phosphorus atoms into carbon materials will increase an interlayer spacing of carbon atoms, which can form new catalytic active sites, improve a utilization rate of a specific surface area of biomass carbon-based materials, and make the carbon materials have higher reactivity.

Graphene is a carbon material composed of single-layer carbon atoms closely arranged in a two-dimensional honeycomb structure. The graphene shows many excellent physicochemical properties, and has attracted widespread attention in various fields since its discovery. The graphene possesses a high specific surface area, great mechanical strength, strong electrical conductivity, good flexibility, and is easily chemically processed. Therefore, the graphene has enormous potential for applications in fields such as electronics, catalysis, optics, and sensors.

The physicochemical properties and electronic properties of the graphene can also be significantly changed through heteroatom doping. Heteroatom doping technology refers to replacing carbon atoms in the graphene with other elements, such as nitrogen, phosphorus, sulfur, etc. The heteroatom doping technology makes heteroatoms enter a carbon skeleton of the graphene through various experimental means. The heteroatom doping will affect an original structure of the graphene, and produce a new graphene-like structure to a certain extent. Therefore, how to obtain high-quality doped graphene and explore a mature and feasible preparation method are particularly important. In recent years, carbon-containing raw materials have been converted into high-quality flash graphene by flash Joule heating. Flash Joule heating technology is a rapid and environmentally friendly material synthesis technology. Rapid temperature rise and fall can reduce energy consumption, and can also rapidly synthesize graphene.

SUMMARY

Based on the above background, embodiments of the disclosure provide a method for preparing phosphorus-doped graphene using phosphorus-containing sludge and biomass. The phosphorus-containing sludge and biomass waste are used as raw materials, which are low in cost, abundant in quantity, and have high potential for utilization. By using phosphorus in the phosphorus-containing sludge as a phosphorus source, the biomass as a carbon source for hydrothermal carbonization reaction, and coupling with flash Joule heating technology, the disclosure achieves the high-value reuse of low-value solid waste.

In order to achieve the above purposes, embodiments of the disclosure provide the following technical scheme.

A method for preparing phosphorus-doped graphene using phosphorus-containing sludge and biomass, includes:
  performing a hydrothermal reaction with the phosphorus-containing sludge and the biomass to obtain a product, washing and drying the product to obtain phosphorus-doped hydrochar, and subjecting the phosphorus-doped hydrochar to a flash Joule heating treatment to obtain the phosphorus-doped graphene.

In an embodiment, the biomass is corn cobs.

In an embodiment, a mass ratio of the phosphorus-containing sludge to the biomass is 1:(1-9).

In an embodiment, a temperature of the hydrothermal reaction is in a range of 150° C. to 300° C.

In an embodiment, a washing solution used in the washing is water and anhydrous ethanol.

In an embodiment, a drying temperature is 105° C., and a drying time is 12 hours (h).

In an embodiment, a discharge voltage of Joule heat in the flash Joule heating treatment is in a range of 150 volts (V) to 300 V, a discharge time of the Joule heat in the flash Joule heating treatment is in a range of 0.1 seconds(s) to 10 s, and a number of a flash in the flash Joule heating treatment is in a range of 1 to 10.

The phosphorus-doped hydrochar prepared in the disclosure needs to measure a resistance before the flash Joule heating treatment, and the resistance should be controlled less than 6 ohms (Ω), and a highest temperature produced by flash Joule heating discharge parameters provided by the disclosure is in a range of 1000° C. to 3500° C.

The beneficial technical effects of the disclosure are as follows.

The disclosure utilizes phosphorus elements in the phosphorus-containing sludge to achieve in-situ doping of the phosphorus elements through a hydrothermal carbonization reaction, thus avoiding the generation of new pollutants. The phosphorus-containing sludge and the corn cobs wasted are transformed into hydrochar through the hydrothermal reaction, which realized the reduction and recycling of the phosphorus-containing sludge and the corn cobs. Flash Joule heating rapidly heats the hydrochar of the phosphorus-containing sludge and the corn cobs to a high temperature in a very short time and then drops rapidly, avoiding the volatilization and decomposition of the hydrochar of the phosphorus-containing sludge and corn cobs, thus forming a graphitized structure and obtaining the phosphorus-doped graphene. A method for preparing the phosphorus-doped graphene by the flash Joule heating only uses electric energy, which is simple, fast, low cost and less pollution. Hydrothermal carbonization can achieve mild reaction and uniform phosphorus doping, and the flash Joule heating can achieve rapid and high-quality graphene preparation. Phosphorus-doped graphene with a high degree of graphitization can be prepared by the hydrothermal carbonization followed by the flash Joule heating.

The method for preparing phosphorus-doped the graphene by the flash Joule heating provided by the disclosure uses cheap and easily available phosphorus-containing sludge and corn cobs as precursors. By using the hydrothermal carbonization to achieve the in-situ doping of the phosphorus elements, followed by the flash Joule heating, high-quality phosphorus-doped graphene is obtained. The method is controllable, fast, simple, and efficient, making it beneficial to large-scale production and application.

DETAILED DESCRIPTION OF EMBODIMENTS

A variety of illustrative embodiments of the disclosure are described in detail. The detailed description should not be considered as a limitation of the disclosure, but should be understood as a more detailed description of some aspects, characteristics and embodiments of the disclosure. It should be understood that the terms described in the disclosure are only for describing special embodiments and are not intended to limit the disclosure.

In addition, for the numerical range in the disclosure, it should be understood that each intermediate value between the upper limit and the lower limit of the range is also specifically disclosed. Each smaller range between any stated value or intermediate value within the stated range and any other stated value or intermediate value within the stated range is also included in the disclosure. The upper and lower limits of these smaller ranges can be independently included or excluded from the range.

Unless otherwise specified, all technical and scientific terms used herein have the same meaning generally understood by those skilled in the art of the disclosure. Although the disclosure is described with reference to preferred methods and materials, any similar or equivalent methods and materials may also be used in the practice or testing of the disclosure as described herein.

The terms "comprise", "include", "have", "contain" and so on used in the text are all open terms, meaning include but not limited to.

Figure 1:
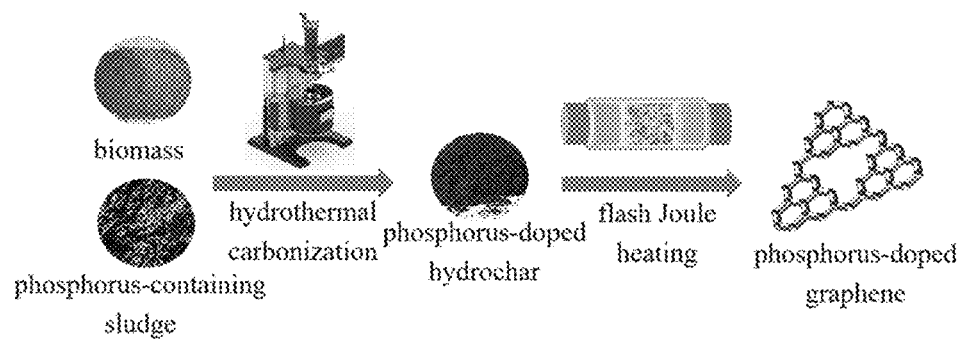
FIG. 1 illustrates a flowchart of a preparation of phosphorus-doped graphene according to an embodiment of the disclosure.

A flowchart of a preparation of phosphorus-doped graphene according to an embodiment of the disclosure is shown in FIG. 1.

An elemental analysis result and an industrial analysis result of phosphorus-containing sludge and corn cobs used in embodiments 1 to 3 of the disclosure are shown in Table 1.

An X-ray fluorescence (XRF) analysis result of the phosphorus-containing sludge used in the embodiments 1 to 3 of the disclosure are shown in Table 2.

TABLE 1 the elemental analysis result and the industrial analysis result of raw materials (i.e., the phosphorus-containing sludge and the corn cobs) used in the embodiments 1 to 3

| raw material | elemental analysis (wt %) | | | | | industrial analysis (wt %) | | | |
|---|---|---|---|---|---|---|---|---|---|
| | $C_{ad}$ | $H_{ad}$ | $N_{ad}$ | $S_{ad}$ | $O_{ad}$* | $M_{ar}$ | $A_{ad}$ | $V_{ad}$ | $FC_{ad}$* |
| phosphorus-containing sludge | 2.39 | 2.51 | 0.48 | 0.81 | 30.77 | 80.14 | 63.04 | 33.60 | 3.36 |
| corn cobs | 45.64 | 5.48 | 0.72 | 0.41 | 46.12 | 9.22 | 1.63 | 73.12 | 16.02 |

TABLE 2 the XRF analysis result of the phosphorus-containing sludge used in the embodiments 1 to 3

| compound | wt % | element | wt % |
|---|---|---|---|
| phosphorus pentoxide ($P_2O_5$) | 63.89 | phosphorus (P) | 27.88 |
| calcium oxide (CaO) | 25.47 | calcium (Ca) | 18.21 |
| natrium oxide ($Na_2O$) | 2.67 | natrium (Na) | 1.98 |
| aluminum oxide ($Al_2O_3$) | 1.92 | aluminum (Al) | 1.02 |
| ferric trioxide ($Fe_2O_3$) | 0.37 | ferrum (Fe) | 0.26 |

Embodiment 1

Preparation of Phosphorus-Doped Graphene (PCC-11-200-1)

(1) Phosphorus-containing sludge and corn cobs are added into a hydrothermal reactor at a mass ratio of 1:1 to obtain a mixture, a reaction temperature is 200° C., and a reaction time is 1 h. After reaction, the mixture in the hydrothermal reactor is filtered to obtain a solid product, and the solid product is washed with anhydrous ethanol and deionized water until supernatant is colorless. The solid product is then dried in a blast oven at 105° C. for 12 hours to obtain phosphorus-doped hydrochar.

(2) 0.1 gram (g) of the phosphorus-doped hydrochar is placed into a 10-millimeter (mm) inner diameter quartz tube wrapped with graphite paper. Two ends of the quartz tube are blocked by graphite electrode plugs with a diameter of 10 mm. The graphite electrode plugs are slowly compressed and resistances of the graphite electrode plugs are measured, and the compression is stopped until the resistances are approximately 1.0Ω. A temperature probe is installed and aligned, a vacuum chamber is closed, and vacuum is drawn to reduce pressure inside the vacuum chamber to 0.02 atmospheres.

(3) A discharge voltage is set to 180 V, and a discharge time is set to 1 s. A discharge process is repeated 3 times and a temperature inside the quartz tube is monitored. During the discharge process, mixture powder (i.e., 0.1 g of the phosphorus-doped hydrochar) emits a dazzling white light, and a maximum temperature is 2500° C. After the 3 times of the discharge process are completed and the quartz tube is cooled to a room temperature, the quartz tube is taken out and reacted powder is poured out. The reacted powder is the phosphorus-doped graphene (PCC-11-200-1).

Embodiment 2

Preparation of Phosphorus-Doped Graphene (PCC-11-240-1)

(1) Phosphorus-containing sludge and corn cobs are added into a hydrothermal reactor at a mass ratio of 1:1 to obtain a mixture, a reaction temperature is 240° C., and a reaction time is 1 h. After reaction, the mixture in the hydrothermal reactor is filtered to obtain a solid product, and the solid product is washed with anhydrous ethanol and deionized water until supernatant is colorless. The solid product is then dried in a blast oven at 105° C. for 12 hours to obtain phosphorus-doped hydrochar.

(2) 0.1 g of the phosphorus-doped hydrochar is placed into a 10-mm inner diameter quartz tube wrapped with graphite paper. Two ends of the quartz tube are blocked by graphite electrode plugs with a diameter of 10 mm. The graphite electrode plugs are slowly compressed and resistances of the graphite electrode plugs are measured, and the compression is stopped until the resistances are approximately 1.0Ω. A temperature probe is installed and aligned, a vacuum chamber is closed, and vacuum is drawn to reduce pressure inside the vacuum chamber to 0.02 atmospheres.

(3) A discharge voltage is set to 180 V, and a discharge time is set to 1 s. A discharge process is repeated 3 times and a temperature inside the quartz tube is monitored. During the discharge process, mixture powder (i.e., 0.1 g of the phosphorus-doped hydrochar) emits a dazzling white light, and a maximum temperature is 2800° C. After the 3 times of the discharge process are completed and the quartz tube is cooled to a room temperature, the quartz tube is taken out and reacted powder is poured out. The reacted powder is the phosphorus-doped graphene (PCC-11-240-1).

Embodiment 3

Preparation of Phosphorus-Doped Graphene (PCC-11-280-1)

(1) Phosphorus-containing sludge and corn cobs are added into a hydrothermal reactor at a mass ratio of 1:1 to obtain a mixture, a reaction temperature is 280° C., and a reaction time is 1 h. After reaction, the mixture in the hydrothermal reactor is filtered to obtain a solid product, and the solid product is washed with anhydrous ethanol and deionized water until supernatant is colorless. The solid product is then dried in a blast oven at 105° C. for 12 hours to obtain phosphorus-doped hydrochar.

(2) 0.1 g of the phosphorus-doped hydrochar is placed into a 10-mm inner diameter quartz tube wrapped with graphite paper. Two ends of the quartz tube are blocked by graphite electrode plugs with a diameter of 10 mm. The graphite electrode plugs are slowly compressed and resistances of the graphite electrode plugs are measured, and the compression is stopped until the resistances are approximately 1.0Ω. A temperature probe is installed and aligned, a vacuum chamber is closed, and vacuum is drawn to reduce pressure inside the vacuum chamber to 0.02 atmospheres.

(3) A discharge voltage is set to 180 V, and a discharge time is set to 1 s. A discharge process is repeated 3 times and a temperature inside the quartz tube is monitored. During the discharge process, mixture powder (i.e., 0.1 g of the phosphorus-doped hydrochar) emits a dazzling white light, and a maximum temperature is 2500° C. After the 3 times of the discharge process are completed and the quartz tube is cooled to a room temperature, the quartz tube is taken out and reacted powder is poured out. The reacted powder is the phosphorus-doped graphene (PCC-11-280-1).

Figure 2:
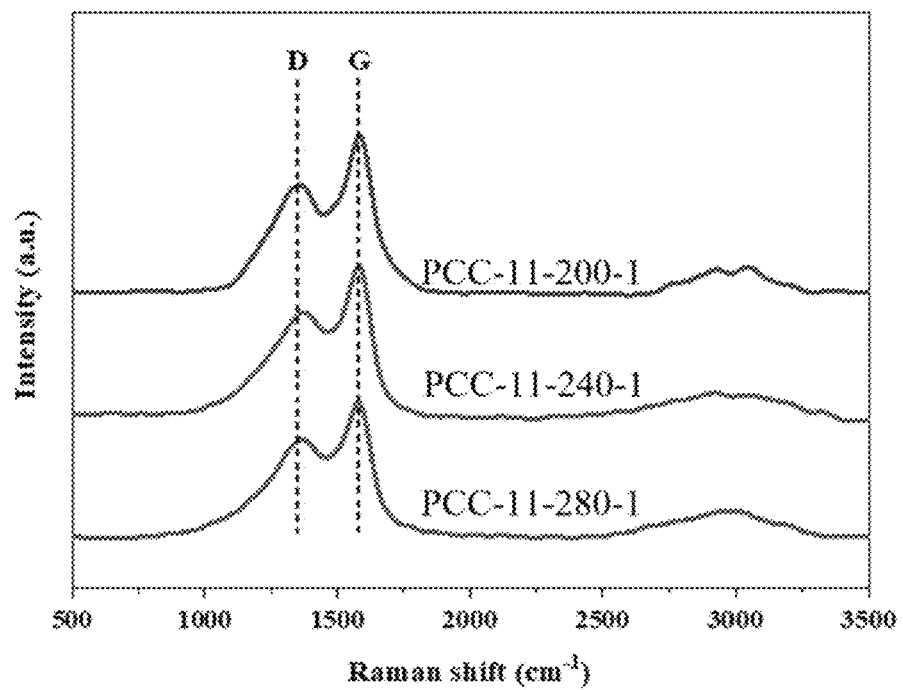
FIG. 2 illustrates a Raman spectrum of three kinds of phosphorus-doped graphene prepared in embodiments 1 to 3 of the disclosure.

A Raman spectrum of three kinds of phosphorus-doped graphene prepared in the embodiments 1 to 3 are shown in FIG. 2. From FIG. 2, it can be seen that the phosphorus-doped graphene prepared in the embodiment 1 shows obvious D and G peaks, and a ratio of $I_D$ to $I_G$ (i.e., $I_D/I_G$) is 0.75. The phosphorus-doped graphene prepared in the embodiment 2 also shows obvious D and G peaks, and a ratio of $I_D$ to $I_G$ is 0.89. The phosphorus-doped graphene prepared in the embodiment 3 shows obvious D and G peaks, and a ratio of $I_D$ to $I_G$ is 0.99. In the Raman spectrum of all samples in FIG. 2, obvious D and G peaks are observed, and a ratio of $I_D$ to $I_G$ is less than 1, indicating that the samples have a graphitic structure with very few defects. Combined with a FT-IR spectrum, it shows that carbon-phosphorus (C—P) bonds in the prepared graphene (i.e., the phosphorus-doped graphene) are generated, which confirms the phosphorus-doped graphene is successfully prepared.

Figure 3:
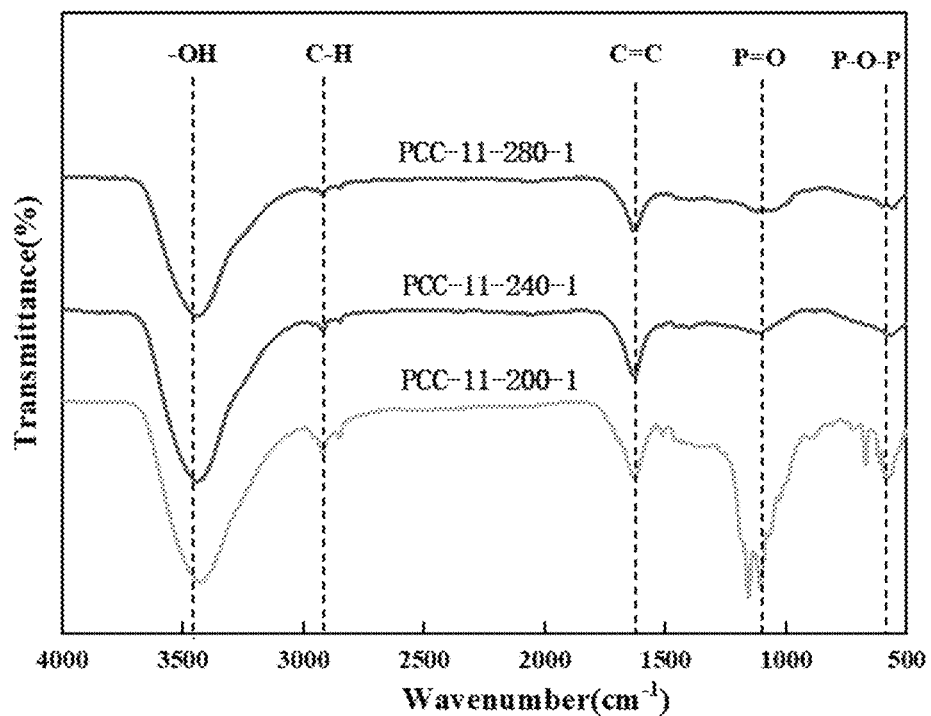
FIG. 3 illustrates a Fourier transform infrared (FT-IR) spectrum of the three kinds of phosphorus-doped graphene prepared in the embodiments 1 to 3 of the disclosure.

The FT-IR spectrum of the three kinds of phosphorus-doped graphene prepared in the embodiments 1 to 3 are shown in FIG. 3. From FIG. 3, it can be seen that main functional groups present in the three kinds of phosphorus-doped graphene prepared in the embodiments 1 to 3 are hydroxyl groups (—OH), carbon-hydrogen bonds (C—H), carbon-carbon double bonds (C=C), phosphorus-oxygen bonds (P—O), and phosphorus-oxygen-phosphorus bonds (P—O—P).

Figure 4:
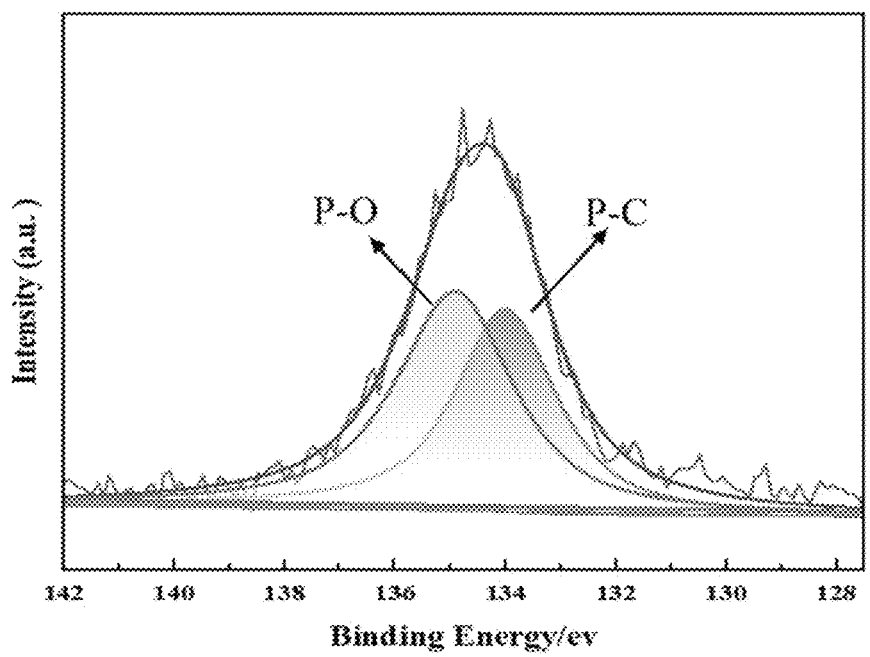
FIG. 4 illustrates an X-ray photoelectron spectroscopy (XPS) diagram of a P2p peak of phosphorus-doped graphene prepared in the embodiment 1 of the disclosure.

An XPS spectrum of a P2p peak of the phosphorus-doped graphene prepared in the embodiment 1 is shown in FIG. 4. From FIG. 4, it can be seen that the phosphorus-doped graphene prepared in the embodiment 1 contains P—O and phosphorus-carbon (P—C) bonds, which confirms that phosphorus is successfully doped into the graphene.

Figure 5:
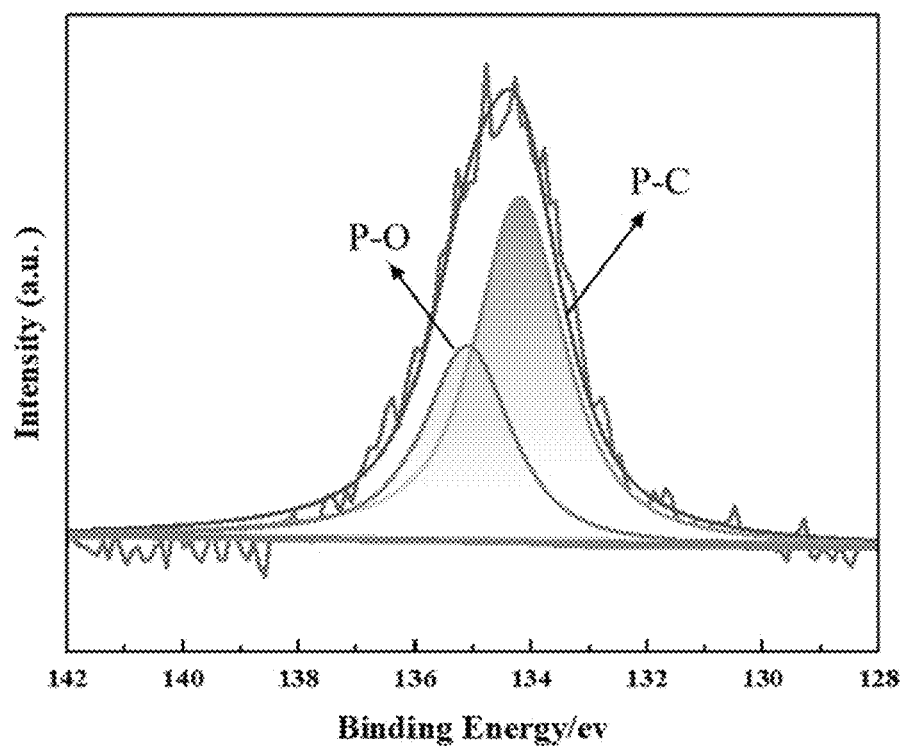
FIG. 5 illustrates an XPS diagram of a P2p peak of phosphorus-doped graphene prepared in the embodiment 2 of the disclosure.

An XPS spectrum of a P2p peak of the phosphorus-doped graphene prepared in the embodiment 2 is shown in FIG. 5. From FIG. 5, it can be seen that the phosphorus-doped graphene prepared in the embodiment 2 contains P—O and P—C bonds, which confirms that the phosphorus is successfully doped into the graphene.

Figure 6:
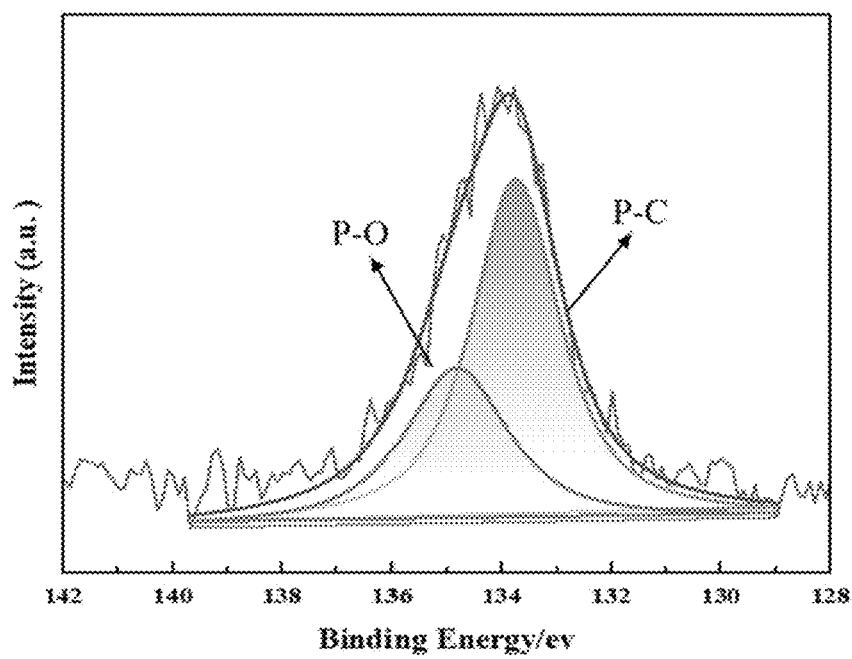
FIG. 6 illustrates an XPS diagram of a P2p peak of phosphorus-doped graphene prepared in the embodiment 3 of the disclosure.

An XPS spectrum of a P2p peak of the phosphorus-doped graphene prepared in the embodiment 3 is shown in FIG. 6. From FIG. 6, it can be seen that the phosphorus-doped graphene prepared in the embodiment 3 contains P—O and P—C bonds, which confirms that the phosphorus is successfully doped into the graphene.

The embodiments described above only describe the preferred mode of the disclosure, and do not limit the scope of the disclosure. Without departing from the design spirit of the disclosure, various modifications and improvements made by those skilled in the art to the technical scheme of the disclosure should fall within the protection scope determined by the claims of the disclosure.

What is claimed is:

1. A method for preparing phosphorus-doped graphene using phosphorus-containing sludge and biomass, comprising:
    performing a hydrothermal reaction with the phosphorus-containing sludge and the biomass to obtain a product, washing and drying the product to obtain phosphorus-doped hydrochar, and subjecting the phosphorus-doped hydrochar to a flash Joule heating treatment to obtain the phosphorus-doped graphene;
    wherein the biomass is corn cobs;
    wherein a mass ratio of the phosphorus-containing sludge to the biomass is 1:(1-9);
    wherein a temperature of the hydrothermal reaction is in a range of 150° C. to 300° C.; and
    wherein a discharge voltage of Joule heat in the flash Joule heating treatment is in a range of 150 volts (V) to 300 V, a discharge time of the Joule heat in the flash Joule heating treatment is in a range of 0.1 seconds(s) to 10 s, and a number of a flash in the flash Joule heating treatment is in a range of 1 to 10.

2. The method for preparing the phosphorus-doped graphene using the phosphorus-containing sludge and the biomass as claimed in claim 1, wherein a washing solution used in the washing is water and anhydrous ethanol.

3. The method for preparing the phosphorus-doped graphene using the phosphorus-containing sludge and the biomass as claimed in claim 1, wherein a drying temperature is 105° C., and a drying time is 12 hours (h).

* * * * *